United States Patent

[11] 3,596,536

| [72] | Inventor | James G. Starling<br>Pekin, Ill. |
|---|---|---|
| [21] | Appl. No. | 869,020 |
| [22] | Filed | Oct. 24, 1969 |
| [45] | Patented | Aug. 3, 1971 |
| [73] | Assignee | Caterpillar Tractor Co.<br>Peoria, Ill. |

[54] TRANSMISSION SHIFT CONTROL WITH CONDITIONAL AUTOMATIC NEUTRALIZING MEANS
6 Claims, 2 Drawing Figs.

[52] U.S. Cl............................................. 74/753,
192/107
[51] Int. Cl...................................................F16h 57/10,
F16d 13/00
[50] Field of Search.............................................74/753, 754

[56] References Cited
UNITED STATES PATENTS

| 3,181,394 | 5/1965 | Ramsel et al. ................ | 75/754 |
| 3,444,762 | 5/1969 | Golan et al. ................ | 74/754 |
| 3,468,194 | 9/1969 | Horsch et al.................. | 74/753 |

*Primary Examiner*—Arthur T. McKeon
*Attorney*—Fryer, Tjensvold, Feix, Phillips & Lempio ABSTRACT: A compact simplified safety valve functions to inactivate fluid operated drive conditioning clutches of a vehicle transmission if the operating fluid pressure has remained below a particular level for a predetermined time and the control lever is not at the neutral position. This prevents the transmitting of drive through the transmission if the vehicle engine should be started up while the transmission controls are at a setting other than neutral.

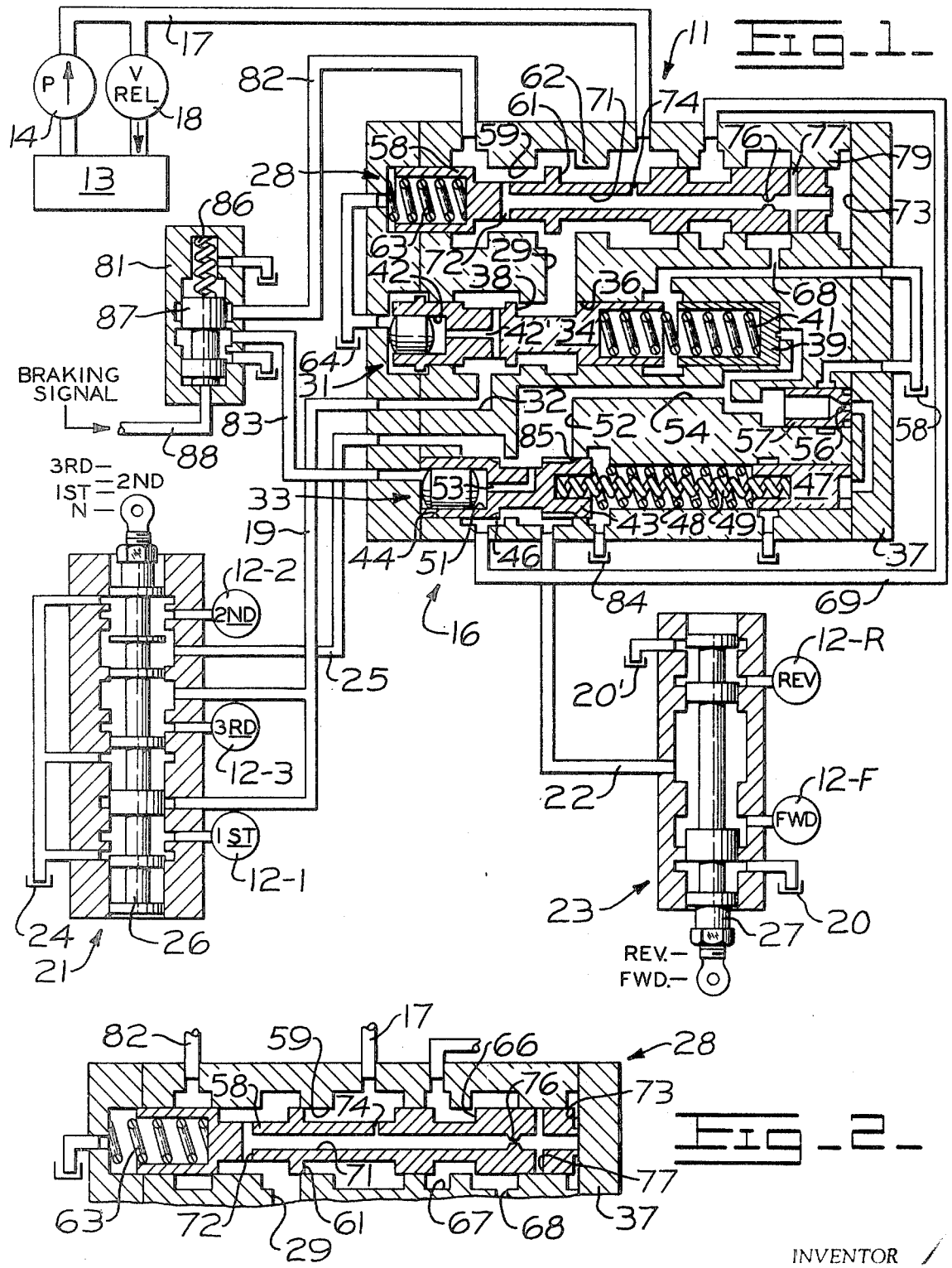

TRANSMISSION SHIFT CONTROL WITH CONDITIONAL AUTOMATIC NEUTRALIZING MEANS

BACKGROUND OF THE INVENTION

This invention relates to drive transmissions for powered vehicles and more particularly to fluid pressure operated control systems for shifting such transmissions between drive ratios.

In certain forms of vehicle transmission, changes of drive ratio in response to manipulation of a control lever or the like, are accomplished by directing fluid under pressure to clutches or brakes within the transmission while relieving the fluid pressure at other clutches or brakes which were previously actuated. Smooth efficient shifting requires careful control and coordination of the pressure changes at the several clutches. This in turn requires a fairly complex pressure modulating system between the source of operating fluid and the selector valves which direct such fluid to the appropriate clutches. Copending application now Ser. No. 738,261 now U.S. Pat. No. 3,481,435 filed June 19, 1968 for Transmission Shift Control and assigned to the assignee of the present application describes a highly efficient valve complex for this purpose. In the system of the copending application, several valve mechanisms interact in response to manipulation of the shift lever to control such factors as the initial pressures at the clutches to be engaged, the rates and timing of pressure rises at the appropriate clutches and the final clutch pressures at the conclusion of the shift transient.

Another highly important function performed by the valve complex of the above identified copending application is that of preventing the passage of torque through the transmission if the operator should start up the engine of the associated vehicle while the transmission control lever or the like is at a position other than neutral. Torque transmission under this condition is undesirable and potentially dangerous. The vehicle may move violently at a time when the operator is unprepared to provide proper control. In order to achieve this safety feature, without interfering with other desired characteristics of the transmission control system, the apparatus of the copending application requires a fairly complex elaboration of the basic system including two additional spool valves with appropriate control passages and external conduits and further requires that a position signal generating valve be mechanically linked to the transmission control lever.

SUMMARY OF THE INVENTION

The present invention provides a simpler and more compact transmission shift control system of the form discussed above with means for assuring a neural condition in the transmission when the engine of the associated vehicle is started. A valve for this purpose responds to a sustained drop of supply fluid pressure, such as occurs when a vehicle engine is shut down, by shifting to a position which prevents any subsequent application of fluid pressure to one or more drive conditioning devices unless the operator's control lever or the like is at the neutral setting or is momentarily returned to the neutral setting. Thus, no external mechanisms are needed for sensing the position of the operator's shift control lever or the like.

Accordingly, it is an object of this invention to simplify the control system for drive transmissions of the class having fluid pressure actuated drive conditioning devices.

The invention together with further objects and advantages thereof will be better understood by reference to the following description of a preferred embodiment in conjunction with the accompanying drawing.

BRIEF DESCRIPTION OF THE DRAWING

In the accompanying drawing:

FIG. 1 is a view, partially sectional and partially schematic, of a transmission shift control system embodying the invention, and FIG. 2 is a section view of a portion of the valve mechanism of FIG. 1 showing the changed position which certain elements assume under conditions to be hereinafter described.

DESCRIPTION OF A PREFERRED EMBODIMENT

Referring to the drawing and more particularly to FIG. 1 thereof, a transmission control system 11 is shown with the components thereof in the positions assumed when the associated transmission has been shifted to neutral with the engine of the vehicle operating. Transmissions of the type to which the system 11 is applicable have a plurality of fluid pressure actuated drive conditioning devices 12 and selected devices 12 or combinations of such devices are actuated to realize particular gear settings.

In most multispeed transmissions, certain ones of the drive conditioning devices 12, which may variously be clutches or brakes, are primarily for the purpose of realizing different speed ratios and the other devices provide for selecting forward or reverse drive. In the present example, there are three clutches 12-1, 12-2 and 12-3 constituting the group of speed clutches and two clutches 12-F and 12-R which constitute the directional clutch group. To realize a particular gear setting, one clutch of each group is actuated. The internal construction of such clutches or brakes and their disposition and function in a transmission are well understood in the art and accordingly will not be further described herein.

Fluid under pressure for actuating the clutches 12 is provided from a reservoir 13 by a pump 14, driven by the vehicle engine, which delivers the pressurized fluid to a control valve group 16 through a conduit 17. To maintain the pressure at the input of the valve group 16 at a constant predetermined value, a relief valve 18 is connected between conduits 17 and a reservoir 13. Valve group 16, which will hereinafter be described in more detail, has a first fluid output conduit 19 communicating with a speed clutch selector valve 21 and a second fluid output conduit 22 to a directional clutch selector valve 23.

Speed clutch selector valve 21 is a manually operated spool valve having four positions corresponding to neutral and first, second and third speeds and at each such position other than neutral the valve directs fluid from conduit 19 to the particular one of the speed clutches 12-1, 12-2 and 12-3 which must be actuated to realize that particular setting of the transmission. Simultaneously, valve 21 communicates the other clutches with a drain 24. At any setting other than neutral, speed clutch selector valve 21 returns a portion of the fluid arriving through conduit 19 back to the valve group 16 through a return conduit 25 wherein the returned fluid is directed to the directional selector valve 23. Directional selector valve 23 is a two-position manually operated spool valve having a first position at which fluid from conduit 22 is directed to the reverse drive clutch 12-R while clutch 12-F is connected to a drain 20 and having a second position at which such fluid is directed to the forward drive clutch 12-F while clutch 12-R is connected to a drain 20'. Suitable operator's control lever linkages for simultaneously manipulating the spools 26 and 27 of selector valves 21 and 23 respectively are known to the art.

When the selector valves 21 and 23 are manually repositioned to initiate a shift of the transmission, control valve group 16 performs several functions. Initially, valve group 16 senses when the speed and directional clutches 12 to be actuated are filled with fluid and then modulates the rates of pressure rise at the two selected clutches, with a predetermined timing relative to each other whereby it is always the selected directional clutch 12-F or 12-R, in this example, which becomes fully engaged last. The last engaging of the two clutches for each speed must absorb the shock loads associated with reestablishing drive through the transmission and in this example, the directional clutches 12-F and 12-R are specifically adapted for this purpose. After completion of the shift transient valve group 16 performs the further function of limiting the maximum pressure applied to the directional clutches.

To effect these results, the fluid in the input conduit 17 to valve group 16 is normally transmitted through a safety valve 28 to an input passage 29 of a pressure modulating reducing valve 31 having an outlet passage 32 communicated with the outlet conduit 19 to speed clutch selector valve 21. During the shift transient, valve 31 effects the desired gradual pressure rise at the appropriate speed clutch 12-1 to 12-3. The fluid which is returned by conduit 25 from the speed clutch selector valve 21 as previously described passes through a pressure modulating reducing valve 33 to the input conduit 22 to directional clutch selector valve 23. Valve 33 determines the initial pressure applied to the selected one of the directional clutches 12-F or 12-R and regulates the rate and extent of pressure rise thereat relative to the pressure conditions at the selected speed clutch, thus assuring proper coordination of the two clutch engagements.

The detailed structure and operation of the pressure modulating valves 31 and 33 may be similar to those of the corresponding components of the system described in the above identified copending application 738,261 and accordingly will be only briefly reviewed herein.

Pressure reducing and modulating valve 31 may have a spool 34 movable axially within a bore 36 of valve group housing 37 and having an edge 38 for controlling the flow of fluid between the previously described input passage 29 and output passage 32 to speed clutch selector valve 21. A load piston 39 is also slidable within bore 36 and a compression spring 41 therein acts between the load piston and spool 34 in a direction tending to increase the flow passage past edge 38. The spring force on spool 34 is opposed by fluid pressure downstream from edge 38 in that a passage 42' in the spool communicates such pressure with a chamber 42 in the end of the spool opposite from spring 41. The actions of valve 31 are interdependent with those of valve 33. Accordingly, valve 33 will also be briefly described to facilitate an understanding of the operation of both valves.

Valve 33 includes a spool 43 movable axially within a bore 44 of valve group housing 37 and carrying an edge 46 defining a variable flow passage between the previously described fluid return conduit 25 from speed clutch selector valve 21 and the outlet conduit 22 to directional clutch selector valve 23. A load piston 47 is also movable axially within bore 44 and a pair of compression springs 48 and 49 act between the load piston in spool 43 in a direction tending to increase the flow passage past edge 46. The force of springs 48 and 49 on spool 43 is opposed by the fluid pressure downstream from edge 46 acting on the end of the spool opposite from the springs. For this purpose, a chamber 51 in the end of the spool is communicated with the region 52 downstream of edge 46 by a passage 53 in the spool.

Accordingly, valve 31 meters the flow of fluid to a selected one of the speed clutches 12 and the fluid pressure thereat may be made to rise in a controlled manner by shifting the associated load piston 39 towards spool 34 to gradually increase the force of spring 41 thereon. Similarly, valve 33 controls the flow of fluid to the selected directional clutch 12 and the rate of pressure increase thereat may be controlled by shifting load piston 47 to increase the force of springs 48 and 49 on spool 43. Both load pistons 39 and 47 are shifted for this purpose by the rising fluid pressure at the selected directional clutch. In particular, a branched passage 54 in valve group housing 37 connects region 52 with the ends of bores 36 and 44 at which the two load pistons are situated whereby the fluid pressure acting on the load pistons gradually rises as the pressure at the selected directional clutch 12-F or 12-R rises. Since it is this particular pressure rise which modulates both valves 31 and 33, and the rate of this pressure rise is determined by the movement of load piston 47 in particular, a flow orifice 56 is provided in the branch of passage 54 which leads to load piston 47, to determine the basic rates of clutch engagement. Flow orifice 56 is situated in a slidable sleeve 57 which also functions as a check valve to relieve the pressure behind load piston 47 to a drain 58 when the pressure in passage 54 drops at the beginning of a shift due to manipulation of directional clutch selector valve 23.

The above described transmission control system would operate to serve its primary purposes if the output conduit 17 from pump 14 connected directly to input passage 29 to valve 31, however, it is highly desirable that the control system perform certain other functions. For example, as hereinbefore discussed the control system should maintain a neutral condition in the transmission if the engine of the associated vehicle is started up with the selector valves 21 and 23 positioned at something other than the neutral setting, until such time as the valves are returned to neutral at least momentarily. This function is accomplished in the present invention by a single additional valve 28 within valve group 16.

Valve 28 includes a spool 58 movable axially in a bore 59 of valve group housing 37, the spool having an edge 61 which coacts with a land 62 of bore 59 to close the fluid supply passage from input conduit 17 to passage 29 when the spool is shifted in a first direction. A compression spring 63 is disposed within bore 59 at one end of spool 58 to urge the spool in the first direction as defined above, the end of the bore at which the spring is situated being permanently opened to a drain 64.

As best shown in FIG. 2, movement of the spool 58 under the influence of spring 63 as described above also causes an additional edge 66 on the spool to open an annular region 67 of bore 59 to a drain passage 68. Referring now to FIGS. 1 and 2 in combination, a conduit 69 communicates bore region 67 with bore 44 of valve 33 at the region thereof upstream from edge 46 of valve spool 43. Thus, shifting of spool 58 of safety valve 28 not only closes the fluid input passage 29 of the modulating system but also opens the directional clutch selector valve fluid supply conduit 22 to a drain. Under this condition, neither directional clutch 12-F or 12-R can be actuated and thus no drive can be transmitted through the associated transmission irrespective of the setting of the selector valves 21 and 23 at that time. Thus, movement of the safety valve spool 58 by spring 63 effectively neutralizes the transmission.

Accordingly, it is necessary to counteract the force of spring 63 on spool 58 except under the undesired startup conditions described above. For this purpose, a passage 71 extends axially within spool 58 and has a first end 72 open to the fluid inlet passage 29 of the modulating system and a second end which opens at the end of the spool opposite from spring 63 in an end region 73 of bore 59. A relatively small radially directed passage 74 communicates spool passage 71 with supply conduit 17 and the passage 71 contains a second constriction 76 between passage 71 and the opening at region 73. A transverse passage 77 in spool 58 communicates the region of passage 71 between constriction 76 and region 73 with drain passage 68 when the spool 58 is positioned to communicate supply conduit 17 with inlet passage 29. Passage 77 is closed by a land 79 of bore 59 when the spool is shifted in the opposite direction by spring 63.

At startup the flow passages within spool 58 as described above transmit fluid pressure to region 73 of bore 59 except under certain conditions to be hereinafter described. This pressure, acting against the end of spool 58, overcomes the force of spring 63 and positions the spool to provide a flow path, past edge 61, between supply conduit 17 and fluid inlet passage 29 of the modulating system. With the safety valve spool 58 positioned in this manner, shifts of the transmission may be effected by appropriate operation of the selector valves 21 and 23 as described above. It should be noted that abrupt impact of the spool 58 against the end of bore 59 during this spool movement is prevented in that passages 77 are open to drain passage 68 just prior to such contact.

If the supply pressure in conduit 17 drops for a sufficient period of time, the fluid pressure acting on the end of spool 58 within bore region 73 is relieved through passage 71 and spring 63 is able to move the spool to the position illustrated in FIG. 2 at which the flow path to input passage 29 is closed, and the flow path to directional clutch selector valve 23 is opened to a drain. Momentary pressure drops, such as occur in the course of a shift transient, do not have this effect owing to the presence of the constriction 76 in passage 71 which slows the pressure decrease in region 73. Typically, constriction 76 is sized to prevent shifting of the spool 58 by spring 63 for a period of 3½ seconds following a pressure drop at supply conduit 17. Pressure drops during a shift transient typically do not last longer than about 0.6 seconds. A pressure drop sufficiently prolonged to shift the spool 58 normally occurs only when the vehicle engine, and thus pump 14 is shut down.

Accordingly, safety valve 28 normally has no significant effect on operation of the control system 11 except at startup. If the selector valves 21 and 23 are at the neutral setting at startup, the rising supply fluid pressure is transmitted to region 73 through constrictions 74 and 76 and spool 58 moves against spring 63 to supply fluid, to modulating valve input passage 29.

However spool 58 does not move in this manner at startup if the selector valves 21 and 23 are not at the neutral setting at this time. Under this condition, the small flow of fluid entering passage 71 through constriction 74 cannot cause a significant pressure rise in bore region 73 as it is drained through a flow path which includes opening 72, passage 29 valve 31, conduit 19, selector valve 21, return conduit 25, conduit 69 and drain passage 68. This pressure relieving flow passage is only closed when the speed clutch selector valve 21 is shifted to neutral setting. Thereafter, the fluid flow through constriction 74 is not relieved and pressure may build up in bore region 73 to move the safety valve spool 58 as described above and enable shifting of the transmission into a desired gear setting.

In many control systems, it is desirable that the transmission also be automatically put into a neutral condition when the vehicle brakes are applied and control system 11 may be adapted for this purpose. Referring again to FIG. 1, a neutralizer valve 81 has an inlet conduit 82 communicating with bore 59 of the safety valve 28 at a location where the flow of fluid to conduit 82 is blocked when the safety valve spool 58 is shifted by spring 63. The outlet conduit 83 of the neutralizer valve 81 communicates with chamber 51 of the directional clutch modulating reducing valve 33 whereby when the neutralizer valve is opened to supply fluid thereto, spool 43 of valve 33 is forcibly shifted to block the flow of fluid to directional clutch selector valve supply conduit 22. Concurrently, this spool movement opens conduit 22 to a drain outlet 84 by providing a flow path past an additional edge 85 on spool 43. Neutralizer valve 81 is held normally closed by a spring 86 acting on the spool 87 thereof, but is opened when the vehicle brakes are applied by application of fluid pressure from the vehicle brake system to one end of spool 87 through a braking signal conduit 88.

As best shown in FIG. 2, when the safety valve 28 acts as described above to maintain the transmission in a neutralized condition, the supply of fluid to neutralizer valve inlet conduit 82 is blocked. This has no practical effect on the operation of the system as a whole inasmuch as the safety valve 28 is itself maintaining a neutralized condition in the transmission when the supply of fluid to neutralizer valve 81 is blocked.

What I claim is:

1. In combination with a transmission having a plurality of fluid pressure actuated drive conditioning devices including a first group of drive conditioning devices and second group of drive conditioning devices and wherein application of fluid pressure to at least one device of each group establishes a selected one of a plurality of drive conditions through the transmission, a control system comprising:

a source of fluid under pressure, a first selector valve having a fluid inlet communicated with said source and having a plurality of drive positions for directing fluid to predetermined ones of said first group of devices and having a neutral position, said first selector valve having a fluid outlet which is communicated with said inlet at any of said drive positions and which is isolated from said inlet at said neutral position, a second selector valve having an inlet communicated with said outlet of said first selector valve and having a plurality of positions for directing fluid to predetermined ones of said second group of devices, and safety valve means having a first position at which the flow path from said source to said first selector valve is constricted and said outlet of said first selector valve is opened to drain and having a second position at which said flow path is enlarged and said outlet is isolated from said drain, said safety valve being biased towards said first position thereof and having means utilizing the pressure of fluid in said constricted flow path to overcome said bias and shift said safety valve to said second position thereof when said pressure rises and said first selector valve is at said neutral position thereby blocking relief of said rising pressure through said outlet thereof.

2. The combination defined in claim 1 wherein said safety valve means comprises a housing having a bore therein with a first portion of said bore forming a portion of the flow path from said source to said first selector valve and with a second portion of said bore forming a portion of the flow path between said outlet and said drain, and a spool movable axially in said bore and having a first edge which closes said first bore portion and a second edge which opens said second bore portion when said safety valve means is at said first position thereof, said first edge being bypassed by a flow constriction.

3. The combination defined in claim 2 wherein said flow constriction is situated in said spool and communicates said passage with said source at all positions of said spool in said bore.

4. The combination defined in claim 1 further comprising a first pressure modulating valve disposed in said flow path between said safety valve means and said first selector valve, and a second pressure modulating valve disposed in the flow path between said first selector valve and said second selector valve.

5. The combination defined in claim 2 wherein said spool is biased towards said first position by spring means acting thereon and wherein said spool has an axial passage communicating the region between said first edge and said first selector valve inlet with the region adjacent an end of said spool to utilize said fluid pressure to overcome said bias.

6. The combination defined in claim 5 wherein said axial passage in said spool contains a flow constriction whereby fluid pressure in said region adjacent an end of said spool is maintained in the presence of brief pressure drops within said region between said first edge and said first selector valve.